(12) United States Patent
Schedelbeck et al.

(10) Patent No.: US 8,040,923 B2
(45) Date of Patent: Oct. 18, 2011

(54) COMMUNICATION METHODS AND APPARATUSES

(75) Inventors: Gert Schedelbeck, Munich (DE); Dietmar Schoppmeier, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 773 days.

(21) Appl. No.: 11/773,863

(22) Filed: Jul. 5, 2007

(65) Prior Publication Data

US 2009/0010315 A1 Jan. 8, 2009

(51) Int. Cl.
*H04J 3/06* (2006.01)
(52) U.S. Cl. ...................................... 370/516
(58) Field of Classification Search ............... None
See application file for complete search history.

(56) References Cited

U.S. PATENT DOCUMENTS

| | | | | |
|---|---|---|---|---|
| 5,802,046 A | * | 9/1998 | Scott | 370/280 |
| 6,381,243 B1 | * | 4/2002 | Ekstedt | 370/395.62 |
| 6,934,307 B2 | * | 8/2005 | DeCusatis et al. | 370/518 |
| 7,106,760 B1 | | 9/2006 | Perumal et al. | |
| 7,209,531 B1 | * | 4/2007 | Katz et al. | 370/517 |
| 2004/0153716 A1 | * | 8/2004 | Baker | 714/4 |
| 2005/0286424 A1 | | 12/2005 | Peeters et al. | |
| 2008/0069149 A1 | * | 3/2008 | Poulin et al. | 370/503 |

FOREIGN PATENT DOCUMENTS

WO  WO 2005/022837 A1  3/2005

OTHER PUBLICATIONS

International Telecommunication Union, Asymmetric digital subscriber line transceivers 2 (ADSL2), G.992.3, Jan. 2005, pp. 1-433.
International Telecommunication Union, ATM-based multi-pair bonding, ITU-T Recommendation G.998.1, Jan. 2005, pp. 1-28.

* cited by examiner

*Primary Examiner* — Anh-Vu Ly
(74) *Attorney, Agent, or Firm* — Slater & Matsil, L.L.P.

(57) ABSTRACT

Communication methods and apparatuses are provided.

29 Claims, 5 Drawing Sheets

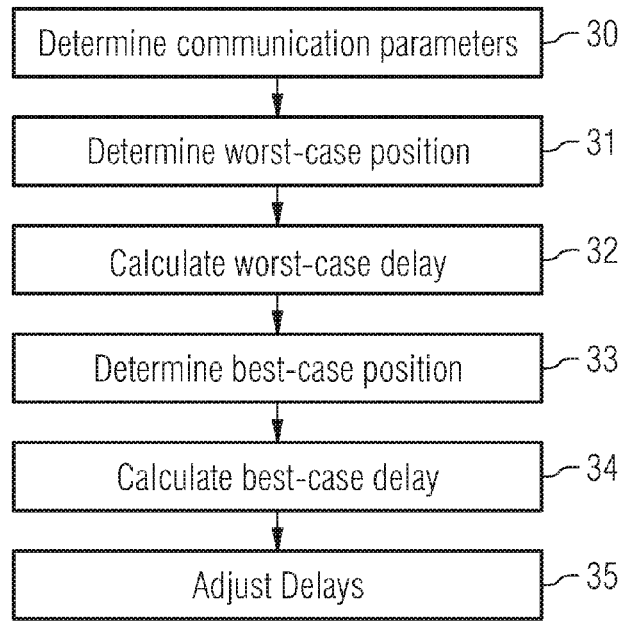
FIG 4
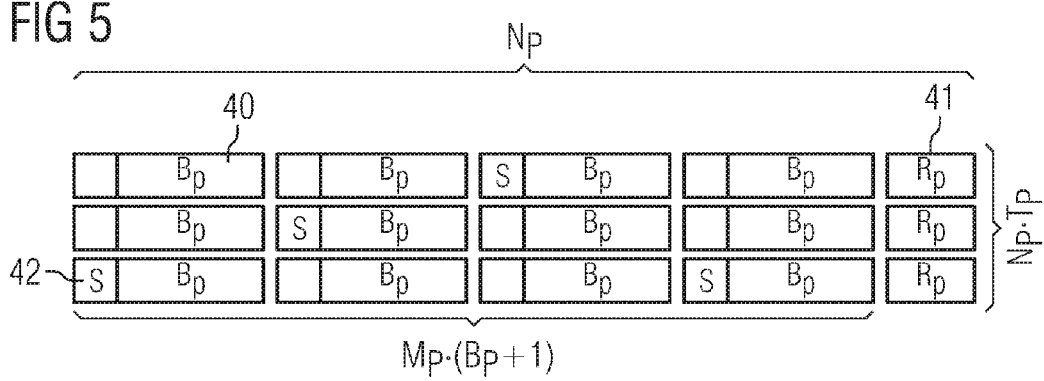
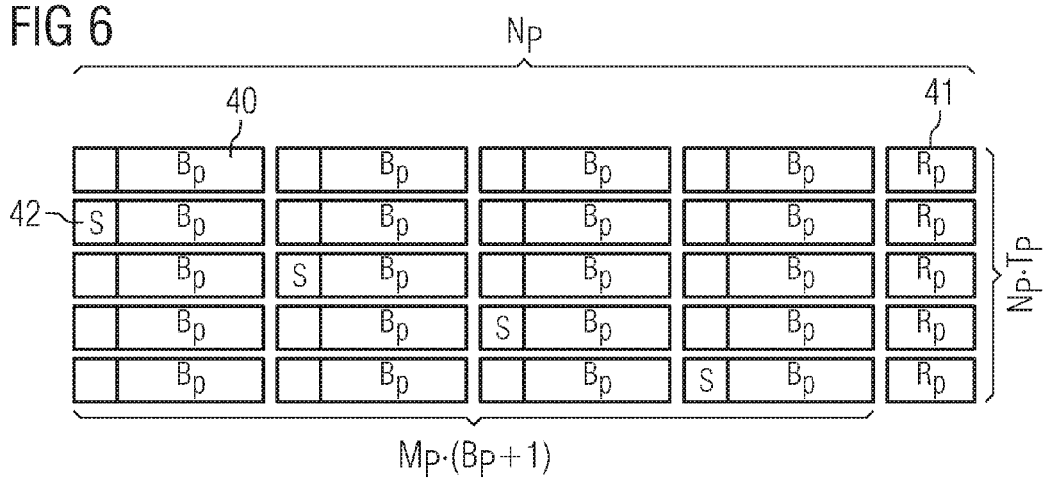

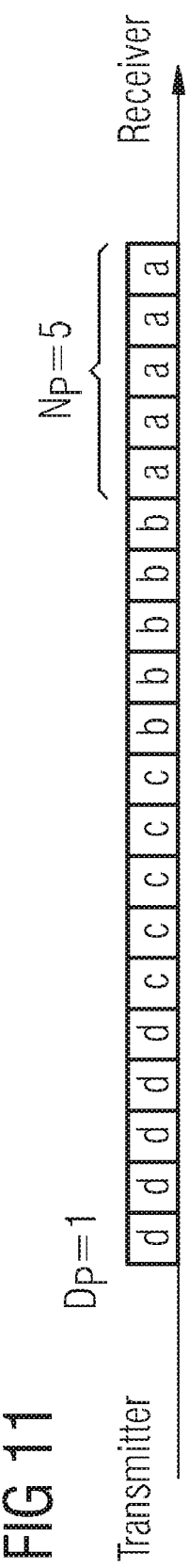
FIG 11  $D_P=1$
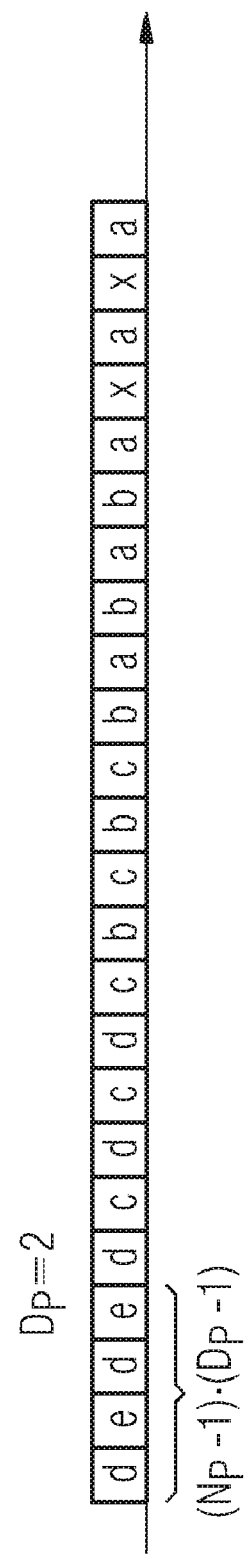
FIG 12  $D_P=2$

COMMUNICATION METHODS AND APPARATUSES

TECHNICAL FIELD

This invention relates to communication methods and apparatuses.

BRIEF DESCRIPTION OF THE DRAWINGS

In the following, exemplary embodiments of the invention will be described with reference to the attached drawings, which are to be taken as illustrative examples only and not to be construed as limitative.

FIG. 4 is a flow diagram of an embodiment of a communication method;

FIGS. 5 and 6 are exemplary diagrams for explaining step 30 of the embodiment of FIG. 4;

FIGS. 11 and 12 are exemplary diagrams for explaining features of embodiments of the present invention.

DETAILED DESCRIPTION OF ILLUSTRATIVE EMBODIMENTS

Figure 1:
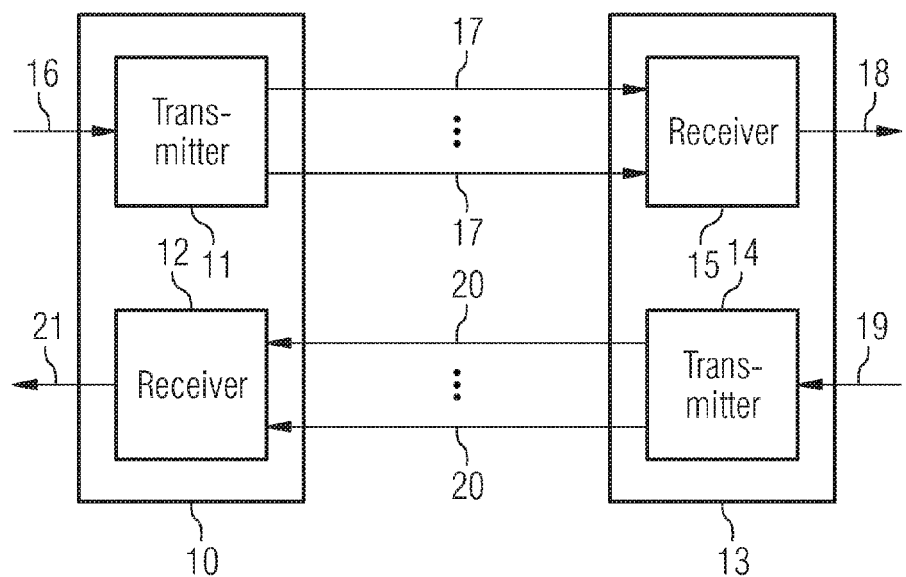
FIG. 1 is a schematic block diagram of an embodiment of a communication system.

In the following, exemplary embodiments of the present invention will be described in detail. It is to be understood that the following description is given only for the purpose of illustrating the invention and is not to be taken in a limiting sense. In particular, the scope of the invention is not intended to be limited by the exemplary embodiments described hereinafter.

It is also to be understood that, in the following description of exemplary embodiments, any direct connection or coupling between functional blocks, devices, components or other physical or functional units shown in the drawings or described herein could also be implemented by an indirect connection or coupling. While some of the exemplary embodiments will be described in the context of digital subscriber line (DSL) technology below, it is to be understood that the various embodiments are not limited thereto. Rather, the methods and apparatuses described below may be applied in other communication devices and methods.

It should be understood that the features of the various exemplary embodiments described herein may be combined with each other unless specifically noted otherwise.

In FIG. 1, an embodiment of a communication system according to the present invention is shown. The communication system of the embodiment shown in FIG. 1 comprises a first transceiver 10 and a second transceiver 13. First transceiver 10 and second transceiver 13 both represent embodiments of communication apparatuses of the present invention.

First transceiver 10 comprises a transmitter 11 and a receiver 12. In the embodiment shown in FIG. 1, transmitter 11 receives data to be transmitted via an input 16 and transmits corresponding data over a plurality of links 17. While in the embodiment of FIG. 1 two links 17 are shown in an exemplary manner, in other embodiments as indicated by dots in FIG. 1 more than two links, for example three links, four links, five links, etc., may be used. The use of a plurality of links for data transmission is sometimes also referred to as bonding. In another embodiment, only a single link 17 is used.

In an embodiment, the communication system of FIG. 1 is a wire-based communication system. In this case, in an embodiment, links 17 use separate transmission lines for data transmission. In an embodiment, the separate lines are twisted pair copper lines.

Second transceiver 13 in the embodiment of FIG. 1 comprises a transmitter 14 and a receiver 15. Receiver 15 in the embodiment of FIG. 1 receives data via the plurality of links 17 and outputs corresponding received data via an output 18.

On the other hand, transmitter 14 of second transceiver 13 in the embodiment of FIG. 1 receives data to be transmitted via an input 19 and transmits corresponding data via a plurality of links 20 to first transceiver 10, where receiver 12 receives the data transmitted via the plurality of links 20 and outputs the received data via an output 21.

While in the embodiment of FIG. 1 two links 20 are shown, as indicated by dots any number of links 20 may be used in embodiments of the present invention. In an embodiment, only a single link 20 is used.

In an embodiment, links 17 use the same physical links as links 20. For example, if the individual links use copper lines, the same copper lines are used for transmitting data from transmitter 11 to receiver 15 and for transmitting data from transmitter 14 to receiver 12. In other embodiments, separate physical links are used for links 17 and links 20.

The embodiment of a communication system shown in FIG. 1 is a bidirectional communication system, i.e., data may be transmitted from transceiver 10 to transceiver 13 and vice versa. In another embodiment, a communication system with a unidirectional communication is provided. For example, in such an embodiment only transmitter 11, link 17 and receiver 15 with the corresponding input 16 and output 18 may be present.

In an embodiment, transceiver 13 may be located at the location of a provider of telecommunication services (central office, CO), while transceiver 10 is located at the site of a customer of this service provider (customer's premises, CPE). However, in another embodiment other locations of transceiver 10 and 13 may be employed.

In an embodiment, the delay of data sent via the links between transmitter and receiver (in the embodiment of FIG. 1, links 17 between transmitter 11 and receiver 15 and/or links 20 between transmitter 14 and receiver 12) differs between the individual links. In other words, data units sent by a transmitter via a plurality of links in an embodiment may be received by the receiver in a different order than sent by the transmitter. In an embodiment, the transmitter assigns an identification, for example, a consecutive number, to each data unit sent, and the receiver uses this identifier to put the received data units in the correct order.

Figure 2:
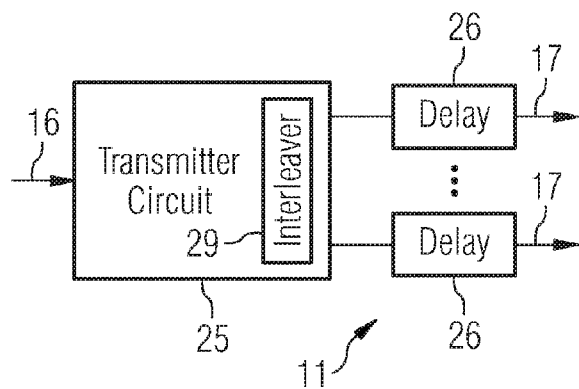
FIG. 2 is a block diagram of an embodiment of a transmitter.

In an embodiment of transmitter 11 of FIG. 1 which is depicted in FIG. 2, transmitter 11 comprises a transmitter circuit 25 receiving data via input 16. Transmitter circuit 25 in an embodiment may comprise a modulator circuit, an interleaver circuit 29, amplifiers and/or other circuitry conventionally used for transmitting data. Transmitter circuit 25 is configured to forward data to be sent to delay units 26, wherein one delay unit 26 is assigned to each link 17. In an embodiment, delay units 26 provide adjustable delays for the data. In an embodiment, the delays of delay units 26 are set to at least partially compensate for the different delays of the links 17.

Delay units 26 in an embodiment may be realized as FIFO (first-in-first-out) buffers of adjustable depth. In another embodiment, a plurality or all of the delay units 26 are realized by using a common memory where incoming data is stored and output again after the adjustable delay.

While in FIG. 2 an embodiment of transmitter 11 of FIG. 1 has been shown, a transmitter with such a structure or a similar structure, for example, in the embodiment of FIG. 1 additionally or alternatively may be used as transmitter 14. In another embodiment, a different transmitter structure may be used.

Figure 3:
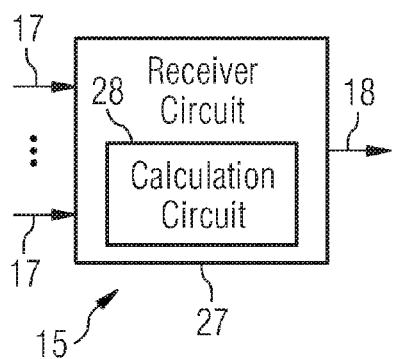
FIG. 3 is a block diagram of an embodiment of a receiver.

In FIG. 3, an embodiment of receiver 15 of FIG. 1 is shown. In the embodiment of FIG. 3, receiver 15 comprises a receiver circuit 27 for receiving data via links 17 and outputting data via output 18. Receiver circuit 27 in an embodiment may, for example, comprise a demodulator circuit, filters, a deinterleaver circuit and/or other circuitry conventionally used for receiving data. Furthermore, receiver 15 of the embodiment of FIG. 3 comprises a calculation circuit 28. In an embodiment, calculation circuit 28 serves for determining delay information regarding the individual links. Such delay information in an embodiment is then used for determining individual delays for delay units 26 of the embodiment of FIG. 2. To this end, the determined delay information or the individual delays obtained therefrom may be communicated from receiver 15 to transmitter 11 via transmitter 13 and receiver 12. In another embodiment, receiver 15 may additionally comprise transmit circuitry for transmitting such information and/or other information relevant for the control and establishment of the communication via links 17 to transmitter 11.

While in the embodiment shown in FIG. 3 a calculation circuit for determining delay information is incorporated in receiver 15, in other embodiments such a calculation circuit may additionally or alternatively be incorporated in the corresponding transmitter. Furthermore, while FIG. 3 shows an embodiment of receiver 15 of FIG. 1, a corresponding receiver structure additionally or alternatively may be employed as receiver 12 of FIG. 1. In yet another embodiment, other receiver structures are used.

An embodiment of a method for determining delay information and adjusting delays like delays of delay units 26 of FIG. 2 will be discussed with reference to FIG. 4. Such a method may, for example, be implemented in calculation circuit 28 of FIG. 3. However, the use of the method according to the embodiment of FIG. 4 and other embodiments is not limited to the embodiments of FIGS. 2 and 3, but may in general be used for determining delays in suitable communication systems.

Moreover, in order to give a better understanding of the embodiment of FIG. 4, the various steps described therein will be explained with reference to FIGS. 5-12 taking ADSL2 (Assymetric Digital Subscriber Line) communication as defined, for example, in the standard ITU-T G.992.3 as an exemplary communication standard. However, it is to be understood that the reference to ADSL2 communication serves only to give a clearer understanding of the embodiment of FIG. 4 and is not to be construed as limitative, since the principles which will be explained with reference to FIG. 4 may be employed with other types of communication, both wireless and wire-based, as well.

In a step 30 of the embodiment of FIG. 4, communication parameters are determined for each of the links used for transmitting data, for example, for each of links 17 and/or each of links 20 of the embodiment of FIG. 1. Such communication parameters in an embodiment may, for example, determine the form of a data structure, for example, a frame structure, used for sending data via the links and may also determine parameters like a bit rate of the respective links.

In ADSL2 as defined by the above-mentioned standard, communication parameters comprise so called base framing parameters, among them $B_p$, $M_p$, $R_p$, $T_p$, $D_p$ and $L_p$, the meaning of which will be explained below. In these parameters p is an index specifying a latency path to which the parameter applies in case a plurality of so called latency paths are used in the communication system. For example, in an embodiment of a communication path without an interleaver and a communication path comprising an interleaver, for interleaving data to be sent may be provided, i.e., two paths having different latencies. Interleaving, in this respect is a technique used in a communication system in connection with so called forward error connection (FEC), wherein consecutive data units are "spread" over a greater time span such that in case of impulses corrupting the transmission only a reduced number of consecutive data units is destroyed.

$L_p$ gives the number of bits per DMT (discrete multi tone modulation) symbol, discrete multi tone modulation referring to a modulation method conventionally used in ADSL communication. $D_p$ gives the interleaving depth, i.e., the depth of an interleaver used for the above-mentioned interleaving. $R_p$ gives the number of Reed-Solomon redundancy octets per so called FEC data frame. A FEC data frame comprises the data over which FEC encoding is performed, in this case by using Reed-Solomon encoding. Through adding redundancy octets, if only some of the transmitted data is destroyed, it may be reconstructed. $B_p$ is a ratio of a number of so called MUX data frames to the number of synchronization octets. A synchronization octet in other words is inserted with every $T_p$-th MUX data frame, the synchronization octet being used for synchronization. $M_p$ gives the number of MUX data frames in an FEC data frame, and $B_p$ gives the nominal number of octets per MUX data frame. In an embodiment, one octet corresponds to one byte.

Example of frame structures depending on such parameters where frame structures are, in an embodiment where ADSL2 is used, used for transmitting data via the individual links, will be explained with reference to FIGS. 5 and 6.

In FIG. 5, an example with $M_p=4$ and $T_p=3$ is shown. In FIG. 5, in each line an FEC frame is shown comprising four MUX frames 40 (for clarity's sake, only one of the MUX frames bears the reference numeral in FIG. 5) each comprising $B_p$ octets. Additionally, each FEC frame comprises $R_p$ redundancy octets designated with reference numeral 41, wherein again only one of the $R_p$ octets is shown with the reference numeral in FIG. 5. In such a case, each FEC frame comprises $N_p = M_p \cdot (B_p+1)+R_p$ octets.

The synchronization octets are marked with "S" in FIG. 5, one of the synchronization octets being exemplary designated with reference numeral 42. Since $T_p=3$ in the example of FIG. 5, a synchronization octet 42 is present in every third MUX frame 40. The structure repeats after $N_p \cdot T_p$ octets or, in other words, the structure shown in FIG. 5 is repeated. It should be noted that the representation with lines and columns as in FIG. 5 is for illustration purpose only, and the data is sent consecutively over the respective link in a corresponding embodiment.

In FIG. 6, a further example of a frame structure is shown, wherein $M_p=4$ and $T_p=5$. The reference numerals for MUX frames, redundancy octets and synchronization octets are the same as already used in FIG. 5. In case of FIG. 6, the structure repeats again after $N_p \cdot T_p$ octets, or in other words, the structure shown in FIG. 6 is transmitted repeatedly over a respective link.

The structures shown in FIGS. 5 and 6, i.e., the structure comprising $N_p \cdot T_p$ octets which is repeated, will also be referred to as a multiframe in the following.

As illustrated, for example, in the embodiment of FIG. 1, over such links data, for example received via input 16 of FIG. 1, is transmitted. In an embodiment, the data to be transmitted is present in the form of data units. In the example of ADSL2 transmission, the data units may be in the form of ATM (Asynchronous Transfer Mode) cells. ATM cells are an example for so called transmission convergence sublayer (TC sublayer) data units, and in other embodiments other TC sublayer data units may be used.

In an embodiment, the data units are distributed to the individual links and, as mentioned above, in an embodiment assigned with an identification to enable a corresponding receiver to restore the original sequence of the data units.

In an embodiment, for each individual link, the data units to be transmitted are "mapped" on the data structure used for transmission, for example, in case of ADL2 transmission the already mentioned ATM cells are mapped on the data structure as in an exemplary manner shown in FIGS. 5 and 6. In such a case, only parts of the data structure not used for other purposes like synchronization octets or redundancy octets may be used to transmit the actual "payload data", in this case the ATM cell.

Returning now to FIG. 4, in step 31 of this embodiment a worst case position of the data unit to be sent within the data structure used for transmission is determined. Worst case position in the embodiment of FIG. 4 relates to the position causing the greatest delay.

Figure 7:
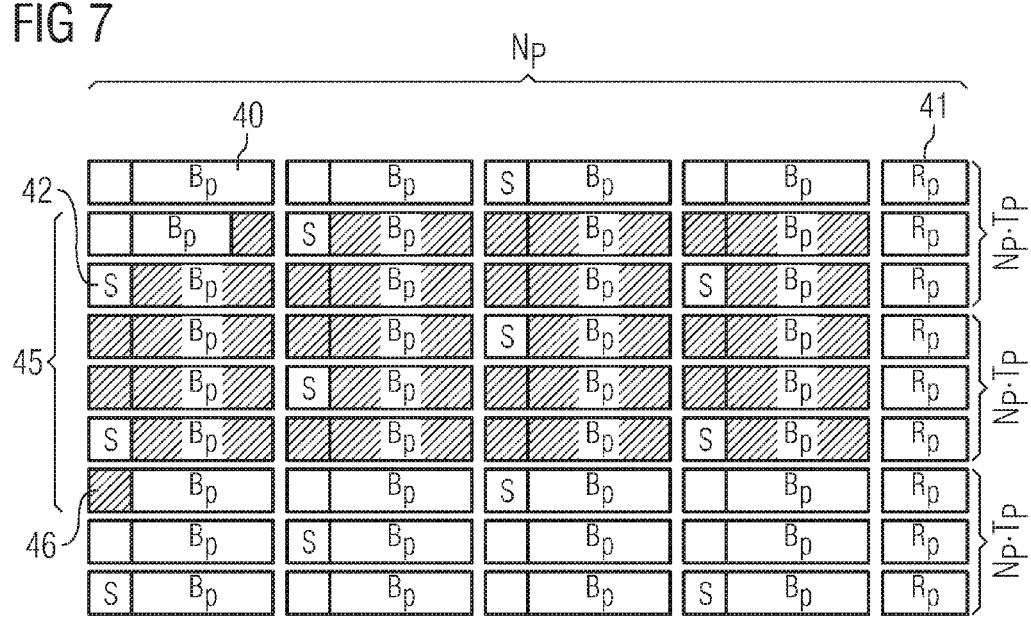
FIGS. 7 and 8 are exemplary diagrams for illustrating step 31 of the embodiment of FIG. 4.
Figure 8:
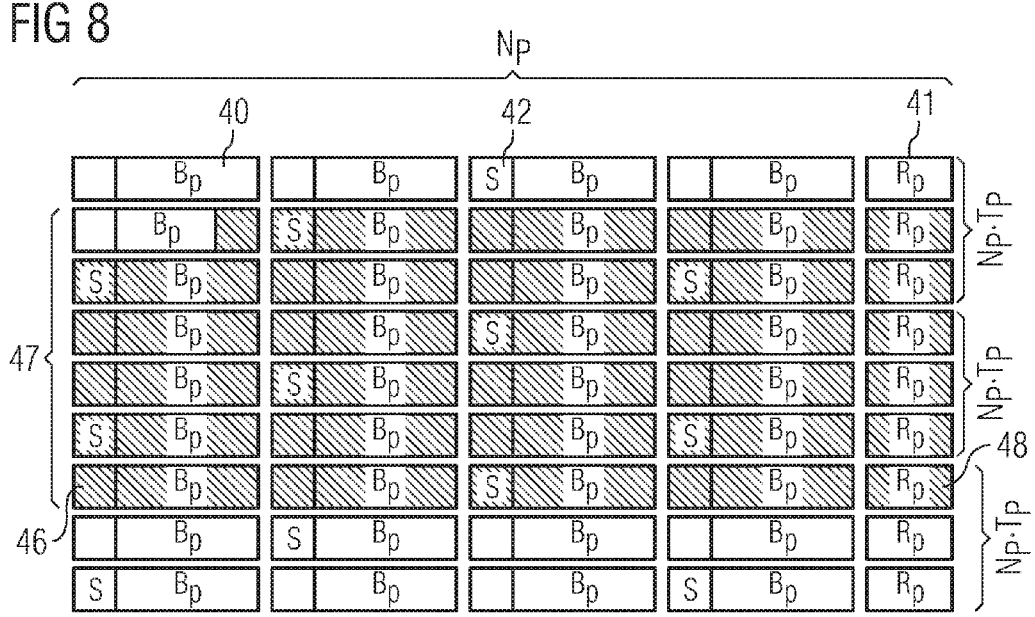

The determining of a worst case position of step 31 of the embodiment of FIG. 4 will be illustrated again using ADSL2 as an example with reference to FIGS. 7 and 8. In FIG. 7, the worst case placement of an ATM cell within multiframes with $M_p = 4$ and $T_p = 3$ as in the example of FIG. 5 is shown. The octets occupied by the ATM cell are shown in a shaded manner and are located in a portion generally designated 45 in FIG. 7. In case of this worst case placement, the last byte or octet of the ATM cell as designated with reference numeral 46 in FIG. 7 coincides with the first octet of a multiframe.

When the ATM cell is transmitted in such a manner, in the illustrative example of ADSL2 transmission the last octet 46 of the ATM cell may only be processed when the so-called cyclic redundancy check of the corresponding FEC frame has been performed, for which corresponding, i.e., following redundancy octets 48 (see FIG. 8) are needed. In other words, the last byte 46 of the ATM cell can only be processed after the corresponding redundancy octet 48 has been received.

To illustrate this, in FIG. 8 the portions of the multiframes which have to be received for processing the ATM cell shown in FIG. 7 are represented in a shaded manner in a portion 47. In particular, processing of the ATM cell may only be performed when the redundancy octets labeled with reference numeral 48 have been received. This causes a delay which is based on the time needed for receiving the octets from immediately after the last byte 46 of the ATM cell up to the redundancy octets labeled 48 in FIG. 8. Again, the explanations with reference to FIGS. 7 and 8 are to be taken only as illustrative, and in other embodiments which may use other communication standards a worst case position may be determined using the same principles, for example, by determining the position of a data unit within a data structure wherein a maximum number of additional bytes or symbols has to be received before processing of the data unit may be performed.

Returning now to FIG. 4, in step 32 based on the worst case position determined in step 31 a worst case delay is calculated. In other words, when calculating the worst case delay the time needed to receive all data needed for processing a data unit, for example a TC sublayer data unit like to above-mentioned ATM cell, is taken into account. In addition to the delay caused by the worst case position determined in step 31, in an embodiment additional delays, which, for example, may be caused by the physical implementation of transmitter and/or receiver and/or delays caused by requirements of a corresponding communication standard may be taken into account. Such delays may, in an embodiment, for example, include a delay caused by interleaving, a delay caused by insertion of data into the data stream which cannot be used to transmit payload data like the above-referenced data units, for example, insertion of synchronization information, redundant information and the like, misalignment of symbols of different links or lines in a group, misalignment between an end of a frame and an end of symbol in a frame, insertion of idle data, i.e., data not carrying information and the like. For illustrating step 32 further, an example of a pseudocode according to an embodiment which uses ATM cells transmitted via an ADSL2 link will be given in the following:

1: $N_p = M_p \cdot (B_p + 1) + R_p$
2: $X = 2 \cdot 53$
3: $Y1 = N_p$
4: $X1 = X - 1$
5: $MF = \text{floor}(X1/(T_p \cdot M_p \cdot (B_p + 1) - M_p))$
6: $Y2 = MF \cdot N_p \cdot T_p$
7: $X2 = X1 - MF \cdot (T_p \cdot M_p \cdot (B_p + 1) - M_p)$
8: $MMDF = \text{floor}(X2/(T_p \cdot (B_p + 1) - 1))$
9: $MDFB1 = MMDF \cdot T_p \cdot (B_p + 1)$
10: $X3 = X2 - MMDF \cdot (T_p \cdot (B_p + 1) - 1)$
11: if $X3 > B_p$ then $MDFB2 = X3 + 1$ else $MDFB2 = X3$
12: $MDFB = MDFB1 + MDFB2$
13: $F = \text{floor}(MDFB/M_p \cdot (B_p + 1))$
14: $Y3 = F \cdot N_p$
15: $MDFBR = MDFB - F \cdot (M_p \cdot (B_p + 1))$
16: $MDFBR > 0$ then $Y4 = MDFBR + R_p$ else $Y4 = 0$
17: $Y = Y1 + Y2 + Y3 + Y4 + (N_p - 1)(D_p - 1)$
18: $MaxDelayInSymbols(z) = 8 \cdot Y/L_p + 6$ In line 1, the number of bytes $N_p$ in an FEC frame is calculated as already explained with reference to FIGS. 5-8.

In line 2, X is defined as the number of payload bytes to be transmitted. In the present example, X is set to two times 53, i.e., the number of bytes of two ATM cells, one ATM cell consisting of 53 bytes. This corresponds to a scenario, for example, at the beginning of a transmission, where a payload cell consisting of 53 bytes arrives to be transmitted just when previously no payload cell was present and therefore an idle cell also consisting of 53 bytes has been inserted to be transmitted. Therefore, X in this case corresponds to the number of bytes of the idle cell and the payload cell (sometimes also referred to a user cell).

As explained with reference to FIGS. 7 and 8, in the worst case position the last byte of the cells or cell to be transmitted coincides with the first byte or octet of a multiframe. In this case, as already explained previously with reference to FIGS. 7 and 8, for processing of this last byte at the receiver the whole FEC frame consisting of $N_p$ bytes has to be received. Therefore, in line 3 Y1 corresponding to the number of bytes which have to be transmitted for the last byte of the X bytes defined in line 2 is set to $N_p$.

In line 4, X1 is set to X−1, i.e., X1 represents the rest of X which has to be taken into account after the number of bytes for the last byte of X has already been determined in line 3.

In line 5, the number of full multiframes MF needed for transmitting the remaining X1 bytes is calculated. In this case "floor" is a function, that as a result yields the integer part of its argument. For example, floor (3.73)=3. A multiframe, as already explained, relates to the structure which is transmitted repeatedly comprising $M_p \cdot T_p$ bytes which in an exemplary manner is shown in FIGS. 5 and 6.

In line 6, a number Y2 of bytes corresponding to the number of multiframes MF calculated in step 5 is calculated. It should be noted that the term $T_p \cdot M_p \cdot (B_p+1) - M_p$ represents the number of payload bytes in a multiframe, whereas the expression $N_p \cdot T_p$ used in line 6 represents the total number of bytes including redundancy bytes and synchronization octets.

In line 7, the still remaining bytes X2 are calculated by subtracting the number of bytes transmitted in the number of multiframes MF calculated in step 5 from X1.

In line 8, the number of groups of $T_p$ MUX frames (also referred to as multi MUX frame hereinafter) needed for the X2 bytes is calculated. In this respect, each MUX frame has $B_p+1$ bytes, wherein for the whole multi MUX frame one byte is used for a synchronization octet.

In line 9, the number of bytes MDFB1 of the number of MMDF multi MUX frames is calculated.

In line 10, a remaining number X3 of bytes to be treated is calculated by subtracting the number of payload bytes transmitted in the MMDF multi MUX frames from X2.

In line 11, the number of bytes in further MUX frames needed for the remaining X3 bytes is calculated. In particular, if $X3 > B_p$ an additional sync octet has to be transmitted as worst case.

In line 12, the total number of needed MUX data frame bytes for X2 is calculated by adding MDFB1 to MDFB2.

In step 13, the number of complete FEC frames needed for the bytes calculated in step 12 is calculated, one FEC frame comprising as, for example, shown in FIGS. 5 and 6, $M_p \cdot (B_p+1)$ MUX frame bytes.

In step 14, a number Y3 of bytes to be transmitted for the number of FEC frames calculated in step 13 is calculated, wherein additionally the redundancy bytes are taken into account.

In step 15, the number of remaining bytes from MDFB, i.e., the number of bytes of MDFB which do not fill up complete FEC frames, is calculated. These bytes correspond to the shaded portion in the second line in the example of FIG. 7.

In line 16, the number of bytes Y4 needed for transmitting this "rest" MDFBR is calculated. In particular, if MDFBR is greater than zero, $R_p$ redundancy bytes additionally have to be transmitted.

In line 17, the total number of bytes Y which need to be transmitted for transmitting the X bytes defined in line 2 in the worst case is calculated. Y is a sum of Y1 to Y4 with an additional term $(N_p-1)(D_p-1)$ taking interleaver delay into account. This interleaver delay will be discussed briefly with reference to FIGS. 11 and 12.

In FIG. 11, a case with an interleaver depth $D_p=1$ corresponding to no interleaving is shown. For illustration, $N_p=5$ is assumed. The bytes of a first FEC data frame are labeled a, the bytes of a second FEC data frame are labeled b, the bytes of a third FEC data frame are labeled c and the bytes of a fourth FEC data frames are labeled d. In this case, the FEC data frames are transmitted consecutively to the receiver, the first FEC data frame (the bytes of which are labeled a) arriving at the receiver first.

In FIG. 12, the situation with $D_p=2$, i.e., with interleaving, is shown. In case of $D_p=2$, between two bytes of a given FEC data frame a byte from a different FEC data frame is inserted. The corresponding sequence of bytes is shown in FIG. 12. In FIG. 12, x denotes bytes corresponding to initial values of the interleaver i.e., idle bytes which are inserted to be able to start interleaving directly. The label, e corresponds to bytes of a SEC data frame following the fourth FEC data frame of FIG. 11. In case no FEC data frame follows, idle bytes may be used instead. As can be seen when comparing FIGS. 11 and 12, through interleaving the arrival of the last byte of the fourth data frame is delayed by $(M_p-1)(D_p-1)$ bytes.

Finally, the maximum delay in symbols is calculated in line 18, wherein the index z denotes the respective link. $L_p$ denotes the number of bits per symbols, such that $8 \cdot Y/L_p$ denotes the number of symbols needed for transmitting the Y bytes calculated in step 17. Furthermore, in the illustrative example shown, six additional symbols are added which in the ADSL2 standard are used as synchronization symbols, cyclic prefix and also reflect the possibility of symbol misalignment between different links, symbol frame misalignment and processing delay in the physical implementation of the transmitter. In some communication standards, it is specified which delay is allowed for the physical realization. For example, an ATM based multi pair bonding according to ITU-G 998.1 a delay of two symbols corresponding to 0.5 ms is allowable.

As a matter of course, the pseudocode is to be taken only as an example, and other ways of calculating the above result are equally possible.

Returning now to FIG. 3, in step 33 the best case position of a data unit to be transmitted within a data structure used for transmitting is determined. In other words, in step 33 the position of the data unit to be transmitted within the data structure which causes the minimum delay, for example, through additional data which has to be transmitted before processing may begin in a receiver, is determined. This will be again explained in an illustrative manner using ADSL2 as an example with reference to FIGS. 9 and 10.

Figure 9:
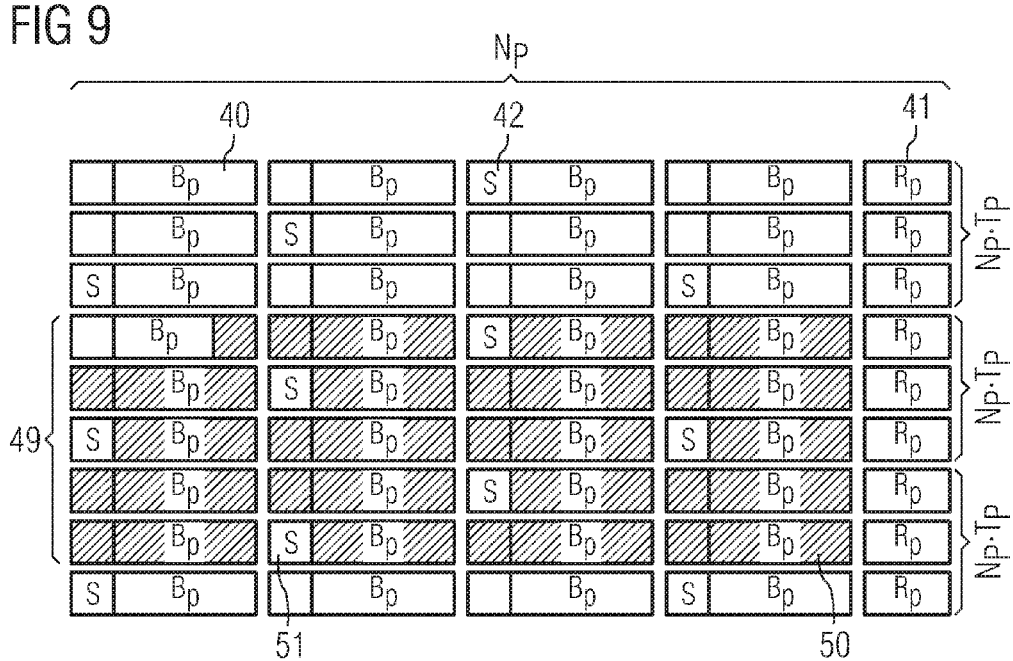
FIGS. 9 and 10 are exemplary diagrams for illustrating step 33 of the embodiment of FIG. 4.
Figure 10:
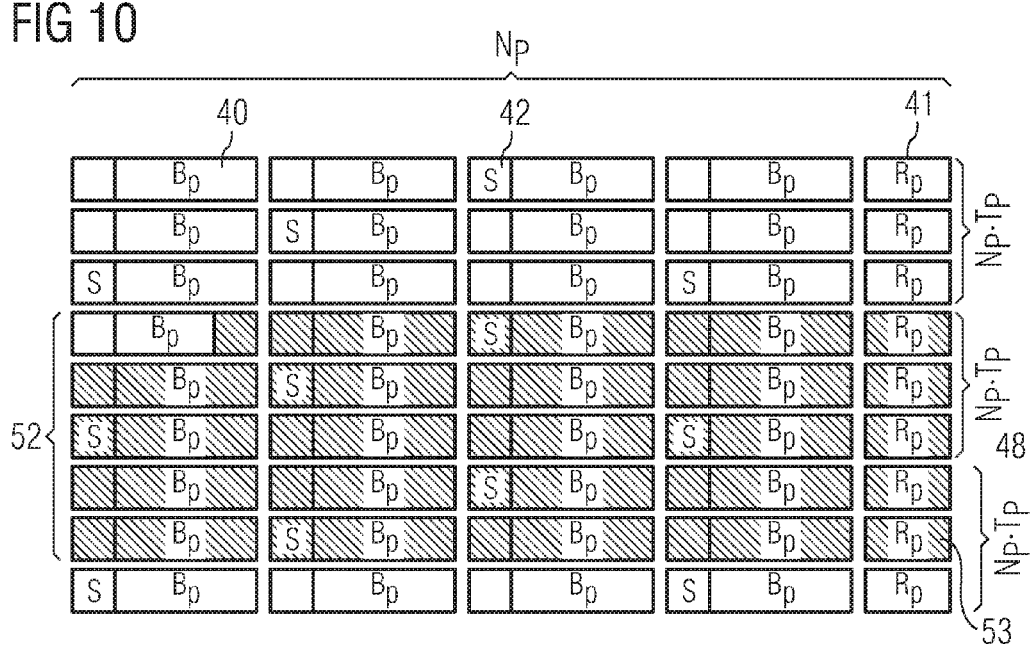

In FIGS. 9 and 10, the same multiframe structure as in FIGS. 7 and 8 is shown, i.e., $M_p=4$ and $T_p=3$.

In FIG. 9, the best case position of an ATM cell (or other data unit to be transmitted) is shown in a shaded manner in a portion generally designated with reference numeral 49. In this case, the last byte of the ATM cell to be transmitted labeled with reference numeral 50 coincides with the last byte of a last MUX data frame within an FEC data frame, wherein $T_p \cdot B_p + T_p - 1$ consecutive bytes at the end of the FEC frame are usable for payload transmission or, in other words, the preceding synchronization octet labeled with reference numeral 51 in FIG. 9 has the "greatest distance" from the end of the FEC frame.

In this case, for processing a data unit like an ATM cell, the data shown in a shaded manner in FIG. 10 in a portion generally denoted with reference numeral 52 has to be received. In particular, in this case after the last byte 50 of the ATM cell of FIG. 9, only the following redundancy bytes labeled 53 in FIG. 10 have to be received in order to enable a receiver to process the ATM cell.

Returning now to FIG. 4, after the best case position has been determined a best case delay is calculated based thereon in the embodiment of FIG. 4 in step 34 thereof. These calculations of the best case delay in an embodiment use the same principle as the worst case delay calculation of step 32, but where in the worst case calculation circumstances leading to the greatest delay are assumed, according to this embodiment for the best case delay calculation the circumstances leading to the smallest delay are assumed. This will be again illustrated using ADSL2 as an example. In the following, a pseudocode is shown which in an embodiment is used for calculation of the best case or minimum delay:

1: $N_P = M_P \cdot (B_P+1) + R_P$
2: $X=53$
3: $MMDF = \text{floor}(X/(T_P \cdot (B_P+1)-1))$
4: $MDFB1 = MMDF \cdot T_P \cdot (B_P+1)-1)$
5: $X1 = X - MMDF \cdot (T_P \cdot (B_P+1)-1)$ 6: MDFB2=X1
7: MDFB=MDFB1+MDFB2
8: F=floor(MDFB/($M_P \cdot (B_P+1)$))
9: Y1=F·$N_P$
10: MDFBR=MDFB−F·($M_P \cdot (B_P+1)$)
11: if MDFBR>0 then Y2=MDFBR+$R_P$ else Y2=0
12: Y=Y1+Y2+($N_P$−1)($D_P$−1)
13: MinDelayInSymbols (z)=8·Y/$L_P$ In line 1, similar to line 1 of the pseudocode given as an example for calculating the worst case delay, the total number of bytes $N_P$ in an FEC data frame is calculated.

In line 2, the number X of payload bytes to be transmitted is defined as 53, i.e., one ATM cell in this example. This corresponds to the situation where, when the ATM cell arrives, an idle cell insertion is just finished such that the ATM cell can be mapped to one or more frames immediately, also without having to insert a synchronization symbol or a cyclic prefix.

In line 3, the integer number of multi MUX data frames needed for X bytes is calculated, one multi MUX data frame as before consisting of $T_P$ MUX data frames.

In line 4, the number of MUX data frame bytes in the number of multi MUX data frames calculated in line 3 is determined.

In line 5, the remaining bytes X1 are calculated. As seen from line 6, this remaining number of bytes corresponds to a number MDFB2 of MUX data frame bytes needed for the transmission of X bytes in addition to the MDFB1 bytes calculated in step 4.

Therefore, in line 7 the total number MDFB of MUX data frame bytes needed as calculated as the sum of MDFB1 and MDFB2.

In line 8, the integer number F of FEC data frames needed for the transmission of MDFB MUX data frame bytes is calculated. In other words, it is calculated how many complete FEC data frames are filled with the MDFB bytes.

In line 9, Y1 which is the number of bytes which have to be transmitted for transmitting the FEC data frames is calculated as F·$N_p$.

In the example of FIGS. 9 and 10, F would be equal to 4 (the FEC data frames of lines 5-8 of this figure).

In step 10, the number of remaining bytes MDFBR, i.e., the number of bytes in addition to complete FEC frames, is calculated. These bytes corresponding to the shaded area in the first line of region 49 of FIG. 9.

In line 11, the number of bytes Y2 needed for transmitting the MDFBR bytes is calculated. In particular, if MDFBR>0 Rp redundancy bytes have to be additionally transmitted.

In line 12, the needed bytes Y for transmitting including the interleave delay are calculated as a sum of Y1, Y2 and the same term for interleaver delay which already has been explained with reference to FIGS. 11 and 12.

Finally, in line 13 the minimum delay in symbols is calculated, wherein z again is the index specifying the link for which the calculation has been performed. In contrast to the worst case, for the best case it is assumed that the end of the interleave frames are aligned with end of symbol, and no further transmission delays occur such that the minimum delay in symbols correspond to 8·Y/$L_P$, wherein $L_P$ as explained is the number of bits per symbol.

Returning now to FIG. 4, in an embodiment the steps 30-34 are performed for each link, i.e., each index z. In another embodiment, the steps are only performed for one link or for a part of the links.

In step 35, based on the calculated worst case delays and/or based on the calculated best case delays of the various links, the delays of delay elements for the individual links are adjusted. In an embodiment, the delay elements are provided at a transmitter, like delay elements 26 shown in FIG. 2.

In an embodiment, the delays of the delay elements are adjusted such that the maximum delay seen by a receiver is at least approximately the same for all links. In an embodiment where the calculation is performed at one end of the line, for example, at a receiver, the results are transmitted to the other end of the line, for example, the corresponding transmitter. In case of ATM based transmission, this may in an embodiment be done using so-called autonomous status message (ASM) cells.

As an example corresponding to the illustrative example given above for the calculation of the maximum delay and the minimum delay, in the following an example for a pseudocode according to an embodiment for adjusting the delays is given:

1: MaxDelayOfAllBondedLinesInSymbols=max(MaxDelayInSymbols(z))
2: PrecompensationDelayInSymbols(z)=MaxDelayOfAllBondedLinesInSymbols−MaxDelayInSymbols(z)
3: PrecompensationDelayIn100MicroSeconds(z)=floor(PrecompensationDelayInSymbols(z)*250/100)
4: MinDelaySymbolsWithPrecompensation(z)=MinDelaySymbols(z)+PrecompensationDelayIn100MicroSeconds(z)*250/100
5: MaxDelayInSymbolsWithPrecompensation(z)+PrecompensationDelayIn100MicroSeconds(z)*250/100

In line 1, the maximum delay MaxDelayOfAllBondedLinesInSymbols of all the links is determined as the maximums of the individual delays determined in step 32 of FIG. 4 for each link.

In line 2, for each link z a delay in symbols, which in case of delay units at a transmitter may also be labeled precompensation delay, is calculated as the maximum delay of all bonded links minus the maximum delay calculated for the respective link. With this choice, for all links at least approximately the maximum delay is seen by a receiver.

Line 3 converts the precompensation delay in symbols for each line to a precompensation delay given in units of 100 microseconds by using that in ADSL2 symbol rate is 1 symbol per 250 microseconds. As a matter of course, with other communication standards this time has to be adjusted accordingly.

In lines 4 and 5, the minimum delay in symbols and the maximum delay in symbols, respectively, for each line taking the delay adjustment calculated in steps 2 and 3 into account are calculated for the case when the precompensation delay in 100 microseconds calculated in line 3 is used as the setting of the respective delay unit. These values may be communicated, e.g., from a receiver to a transmitter, e.g., by using ASM cells.

It is to be understood that the above-described embodiments serve only as examples, and numerous modifications are possible without departing from the scope of the invention. For example, while in the embodiment of FIG. 1 a plurality of links are shown, an embodiment of the present invention may comprise only a single link, wherein a maximum delay and a minimum delay for this single link is calculated. Furthermore, while in the above embodiments ATM cells have been described as an example for data units which are to be transmitted, the embodiments described are independent from the type of data unit and may therefore also be used for other kinds of data units. In such an embodiment which is, for example, based on the pseudo codes given above, the value for X then would be adjusted to the number of bytes of this data unit.

Moreover, while in the embodiment of FIG. 4 a worst case delay and a best case delay is calculated, in another embodiment only one of these extremal delays is calculated. While in the embodiment of FIG. 4 the results are used for adjusting delay units, in other embodiments the results may be used for other purposes, for example, for information purposes.

Furthermore, while in FIGS. 5-10 a specific frame structure has been used as an illustrative example, in a different embodiment a different data structure for transmitting data units via a link may be used. Also with a different data structure, the position of the data unit within the data structure may be varied to determine a worst case position and a best case position in an embodiment.

Furthermore, while the communication parameters described above which determine the data structure used for transmission via the links have been described using ADSL as an example, similar or other parameters are used in other types of communication, and worst case and/or best case positions of data units within the data structures may be determined using such parameters. For example, in VDSL a similar interleaving and framing, i.e., a similar data structure is used. However, instead of a TC sublayer using ATM cells, in VDSL2 a packet aggregation function (PAF) with sublayer data units having 64 or 65 octets is used. In this case, instead of ATM cells having 53 bytes, packets having 64 bytes would be used for calculation in an embodiment. Furthermore, while in the ADSL case an idle cell insertion of 53 bytes has been assumed for the worst case, with the VDSL 2 TC sublayer using 64 or 65 octets according to current standards the delay would be 3 bytes as a maximum, an idle byte, a synchronization byte and a start of packet byte. Therefore, for example, in an embodiment for calculating the worst case delay instead of $X=2 \cdot 53$ in the example above $X=64+3$ could be used.

Similar modifications may be made for adapting the above embodiments to other communication standards or methods.

Further modifications are apparent to persons skilled in the art without departing from the spirit and scope of the present invention, which is not intended to be limited by the exemplary embodiments defined above, but intended to be limited only by the appended claims.

What is claimed is:

1. A communication method comprising:
   determining a position of a data unit within a data structure used for transmitting the data unit such that the position causes an extremal delay;
   calculating the extremal delay based on the position; and
   electronically communicating data with a timing based at least in part on the extremal delay, wherein the extremal delay comprises a maximum delay or a minimum delay, wherein
   the data structure comprises a plurality of frames; and
   determining comprises determining the position such that a last data subunit of the data unit coincides with a first subunit of a frame.

2. The communication method according to claim 1, wherein determining comprises determining the position such that a maximum amount of data has to be transmitted before the data unit is processable by a receiver.

3. The communication method according to claim 1, wherein the last data subunit is a byte.

4. The communication method according to claim 1, wherein a calculating step comprises calculating a number of subunits of the data structure that have to be transmitted before processing of the data unit is possible at a receiver.

5. The communication method according to claim 4, wherein calculating further comprises calculating a time needed for transmitting the number of subunits.

6. The communication method according to claim 1, further comprising determining at least one communication parameter describing the data structure.

7. The communication method according to claim 6, wherein the at least one communication parameter comprises at least one communication parameter selected from the group consisting of a parameter defining an addition of redundancy data, a parameter defining a number of data subunits per frame, a parameter determining a depth of an interleaver, a parameter defining a frequency of synchronization information, and a parameter defining a number of bits per symbol.

8. The communication method according to claim 1, further comprising setting a delay of a delay circuit based on the extremal delay.

9. The communication method according to claim 1, wherein transmitting or receiving comprises:
   transmitting data units via a plurality of communication links; and
   wherein determining and calculating are performed for each link individually to calculate an extremal delay for each link.

10. The communication method according to claim 9, further comprising setting respective delays of delay circuits for each link based on the calculated extremal delays.

11. The communication method according to claim 10, wherein setting comprises setting the delays such that a maximum delay for all communication links is approximately the same.

12. The communication method according to claim 1, wherein the communication method is a DSL based communication.

13. The communication method according to claim 1,
   wherein the data structure comprises at least one frame; and
   wherein determining comprises determining the position of the data unit such that a maximum or a minimum number of data subunits in the at least one frame that would need to be decoded after a last data subunit is received in order to decode the data unit.

14. The method according to claim 1, wherein the position causes an influence on the extremal delay, wherein the influence on the extremal delay is independent of delays caused by a physical implementation of a transmitter and/or a receiver and independent of link delays between the transmitter and the receiver.

15. The communication method according to claim 14, wherein electronically communicating data further comprises electronically communicating the data with the timing based on a further influence on the extremal delay, wherein the further influence is caused by the physical implementation of the transmitter and/or the receiver.

16. A communication apparatus, comprising:
   a communication circuit to communicate via at least one link using a data structure, the communication circuit comprising a transmitter circuit and/or a receiver circuit; and
   a calculation circuit to determine a position of a data unit within the data structure such that the position causes an extremal delay, and to calculate the extremal delay based on the position wherein the extremal delay comprises a maximum delay or a minimum delay, wherein
   the data structure comprises a plurality of frames, and
   the position of a data unit is determined such that a last data subunit of the data unit coincides with a first data subunit of the frame.

17. The apparatus according to claim 16 wherein the position of a data unit is determined such that a maximum amount of data has to be transmitted before the data unit is processable by a receiver.

18. The apparatus according to claim 16, wherein the data subunit is a byte.

19. The apparatus according to claim 16 wherein the communication circuit is configured to determine at least one communication parameter describing the data structure.

20. The apparatus according to claim 16
wherein the communication circuit is configured to communicate via a plurality of communication links; and
wherein the extremal delay is determined for each of the plurality of communication links.

21. The apparatus according to claim 20, further comprising a plurality of delay circuits, one delay circuit being assigned to each communication link.

22. The apparatus according to claim 16,
wherein the data structure comprises at least one frame; and
wherein determining comprises determining the position of the data unit such that a maximum or a minimum number of data subunits in the at least one frame that would need to be decoded after a last data subunit is received in order to decode the data unit.

23. The apparatus according to claim 16, the position causes an influence on the extremal delay, the influence on the extremal delay is independent of delays caused by a physical implementation of a transmitter and/or a receiver and independent of link delays between the transmitter and the receiver.

24. The apparatus according to claim 23, further comprising the transmitter, the transmitter configured to transmit data using a timing based on the extremal delay.

25. The apparatus according to claim 24, wherein the extremal delay is further influenced by a delay caused by the physical implementation of the transmitter and/or the receiver.

26. A communication method comprising:
determining a position of a data unit within a data structure used for transmitting the data unit such that the position causes a delay, wherein the data structure comprises a plurality of frames, and wherein determining comprises determining the position such that a last data subunit of the data unit coincides with a first subunit of a frame;
calculating the delay based on the position; and
electronically communicating data with a timing based at least in part on the delay.

27. The communication method according to claim 26, wherein the last data subunit is a byte.

28. A communication apparatus, comprising:
a communication circuit to communicate via at least one link using a data structure, the communication circuit comprising a transmitter circuit and/or a receiver circuit; and
a calculation circuit to determine a position of a data unit within the data structure such that the position causes a delay, and to calculate the delay based on the position, wherein the data structure comprises a plurality of frames, and wherein the position of a data unit is determined such that a last data subunit of the data unit coincides with a first data subunit of the frame.

29. The apparatus according to claim 28, wherein the data subunit is a byte.

* * * * *